No. 816,381. PATENTED MAR. 27, 1906.
G. A. RUMBEL.
BALE TIE MACHINE.
APPLICATION FILED JULY 7, 1905.
11 SHEETS—SHEET 1.
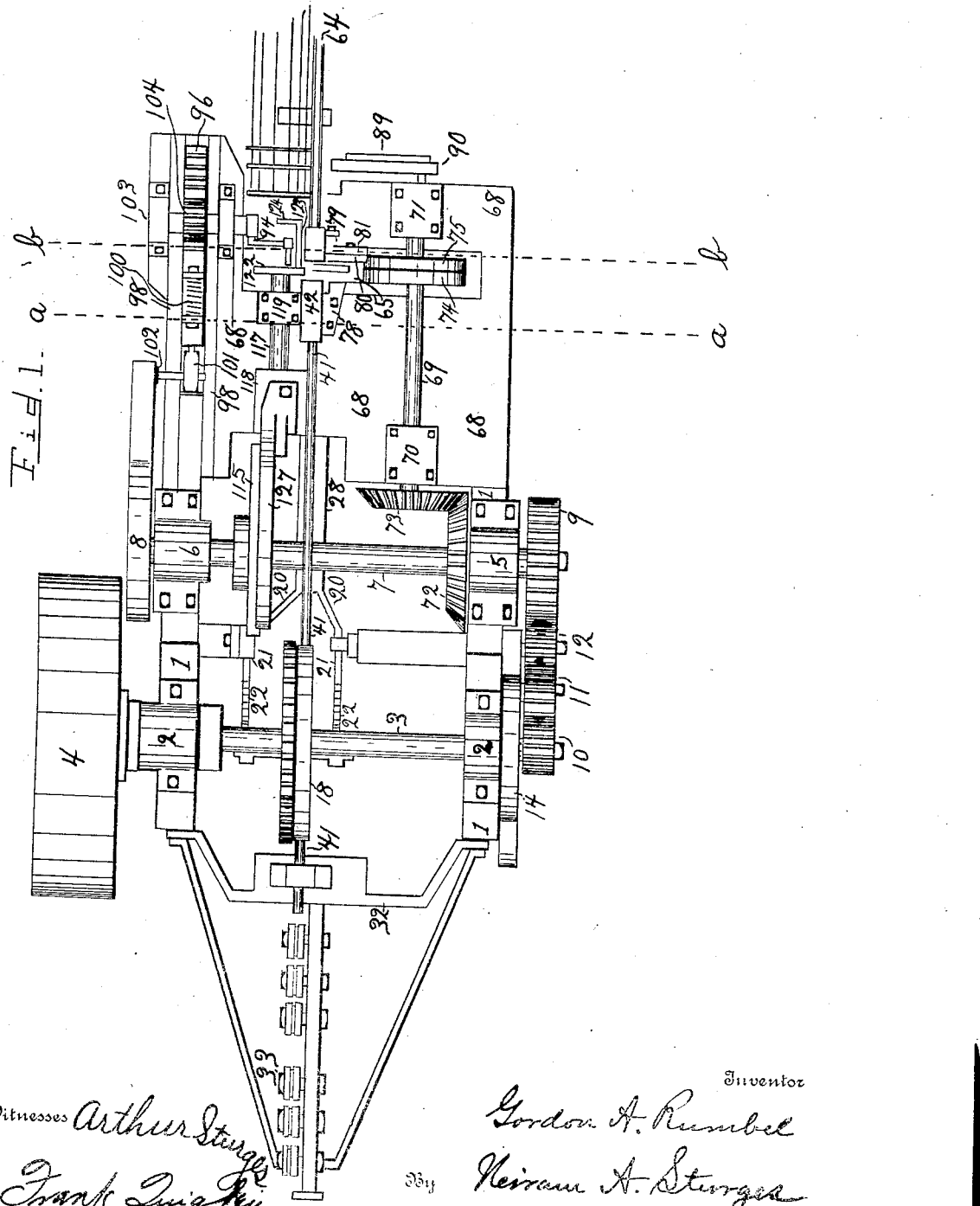
Witnesses Arthur Sturges
Frank Quigley
Inventor
Gordon A. Rumbel
By Hiram A. Sturges
Attorney

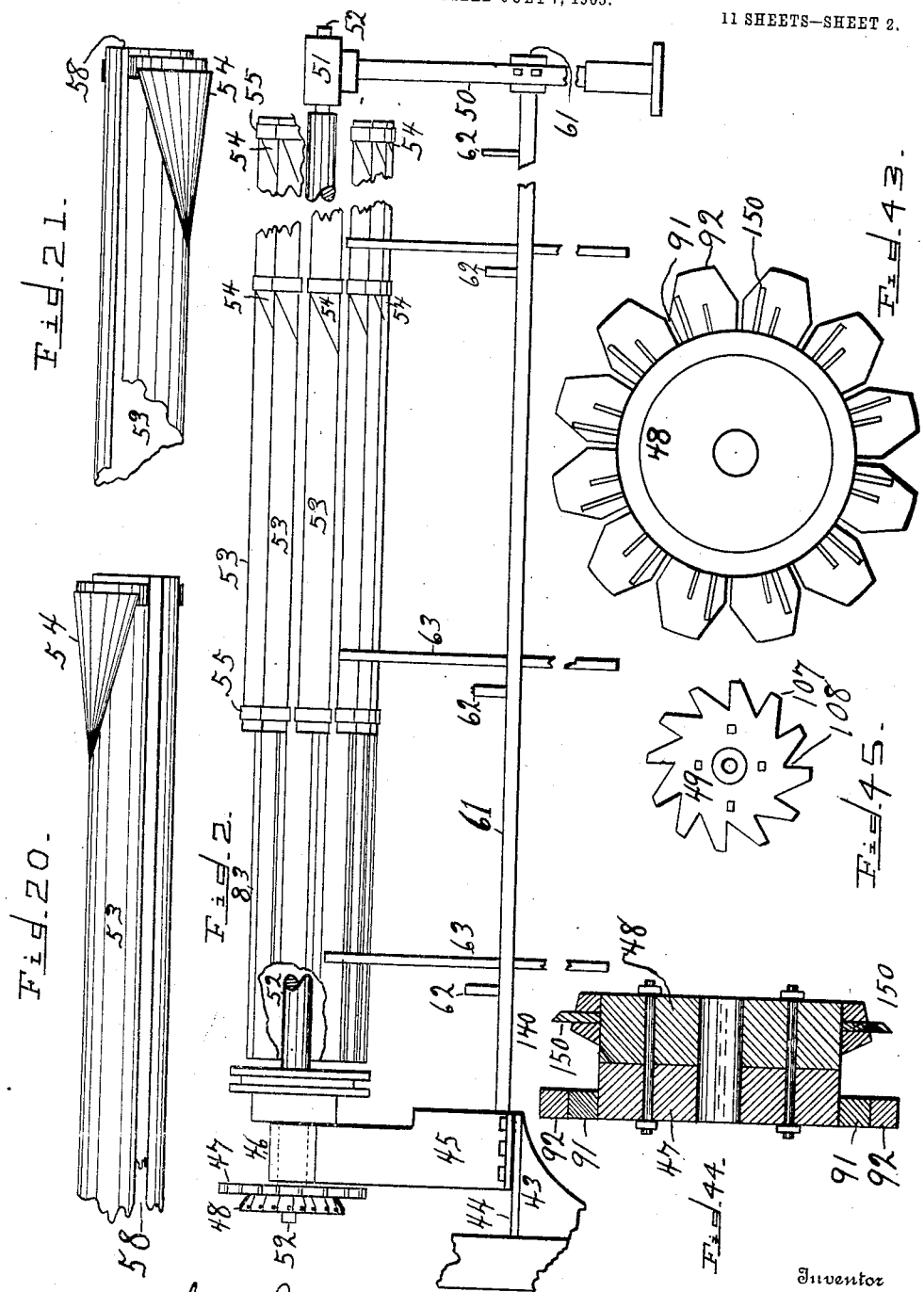

No. 816,381. PATENTED MAR. 27, 1906.
G. A. RUMBEL.
BALE TIE MACHINE.
APPLICATION FILED JULY 7, 1905.
11 SHEETS—SHEET 3.
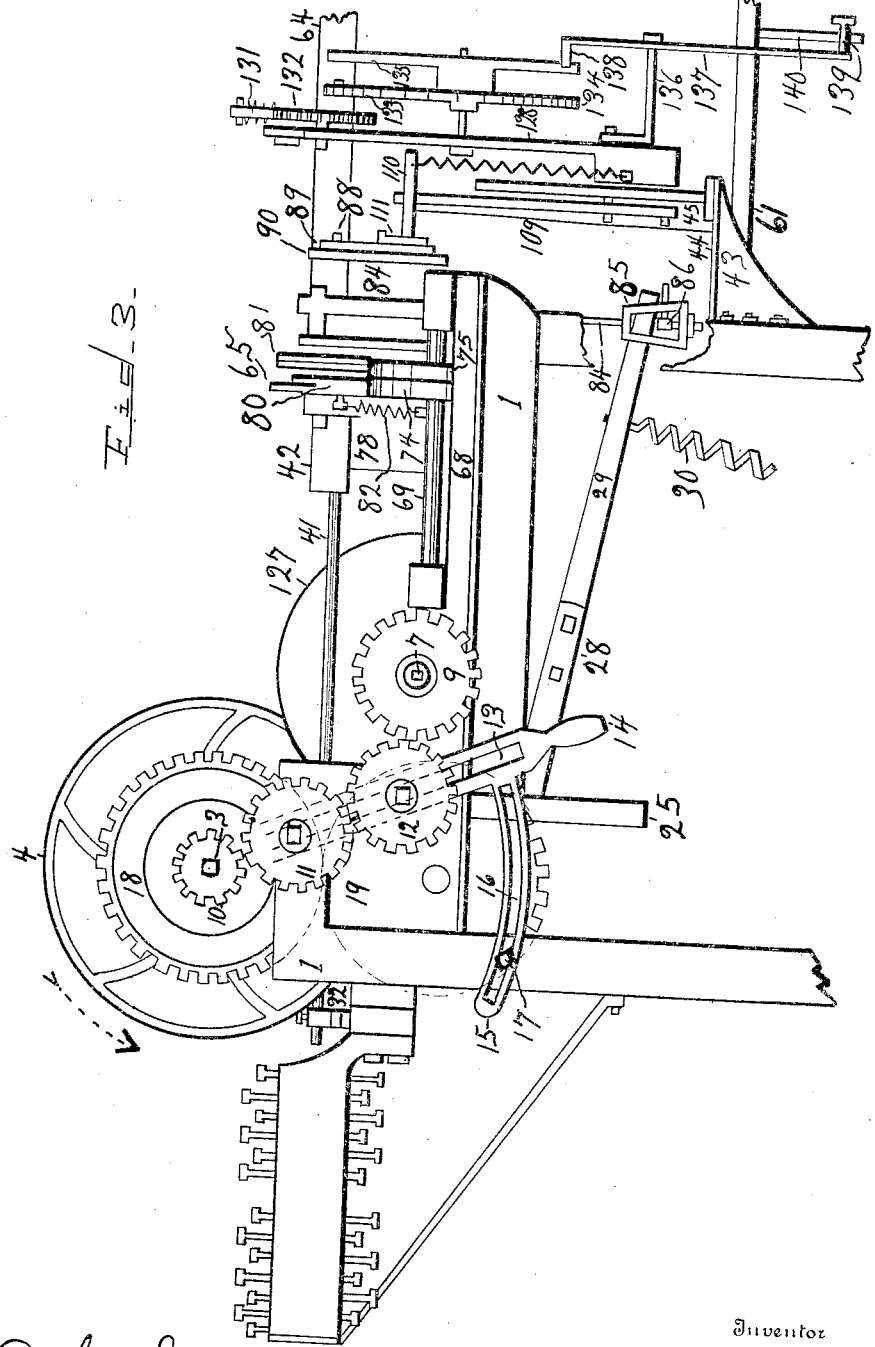
Witnesses
Arthur Sturges.
Frank Quigley
Inventor
Gordon A Rumbel
By Hiram A. Sturges
Attorney No. 816,381. PATENTED MAR. 27, 1906.
G. A. RUMBEL.
BALE TIE MACHINE.
APPLICATION FILED JULY 7, 1905.
11 SHEETS—SHEET 4.
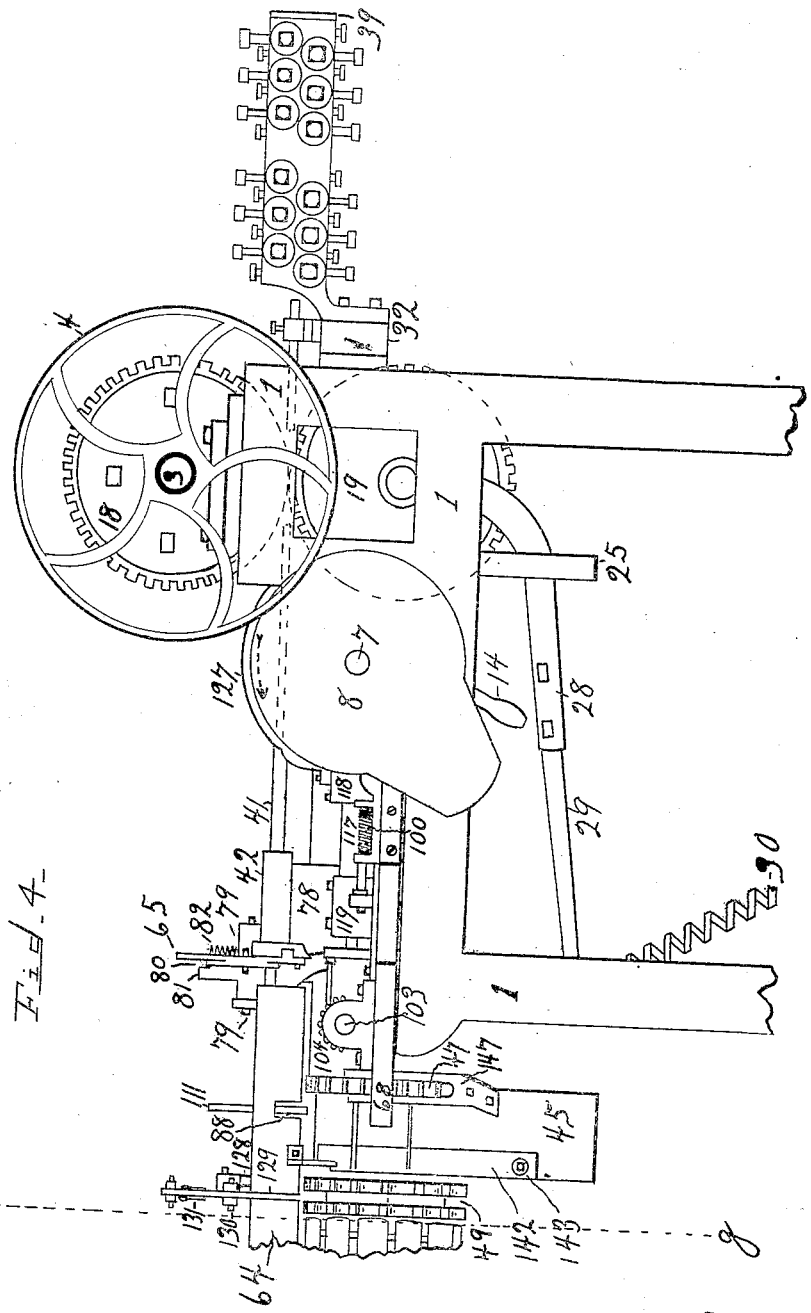

No. 816,381. PATENTED MAR. 27, 1906.
G. A. RUMBEL.
BALE TIE MACHINE.
APPLICATION FILED JULY 7, 1905.
11 SHEETS—SHEET 5.
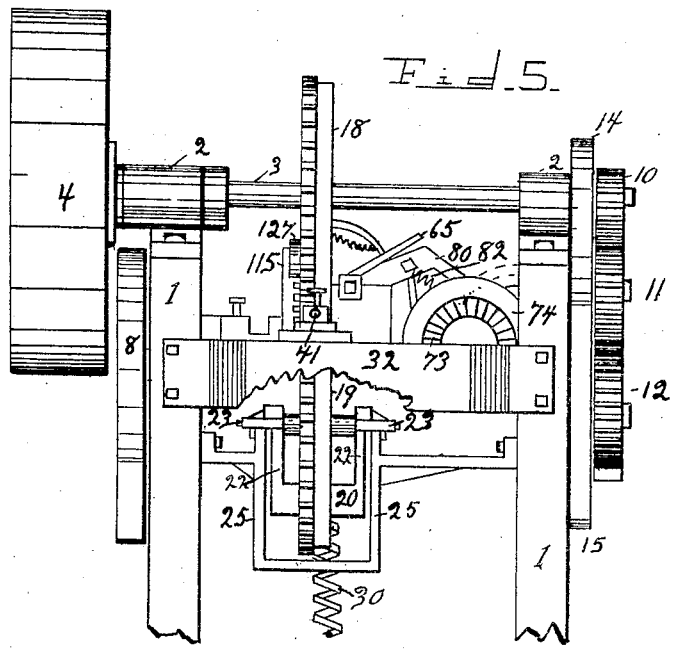
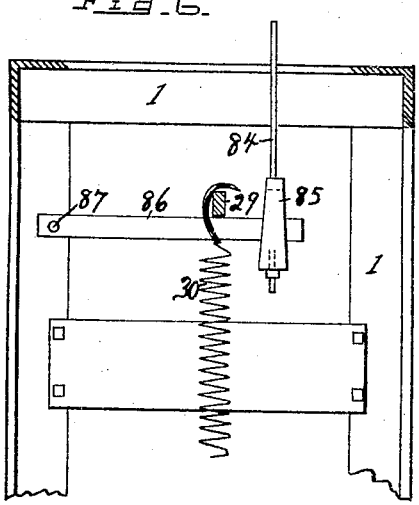
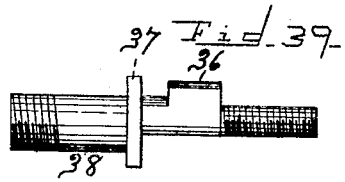
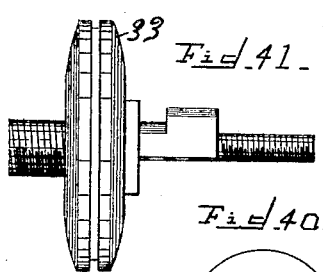
Witnesses Arthur Sturges
Frank Quigley
Inventor
Gordon A. Rumbel
By Hiram A. Sturges
Attorney No. 816,381. PATENTED MAR. 27, 1906.
G. A. RUMBEL.
BALE TIE MACHINE.
APPLICATION FILED JULY 7, 1905.
11 SHEETS—SHEET 6.
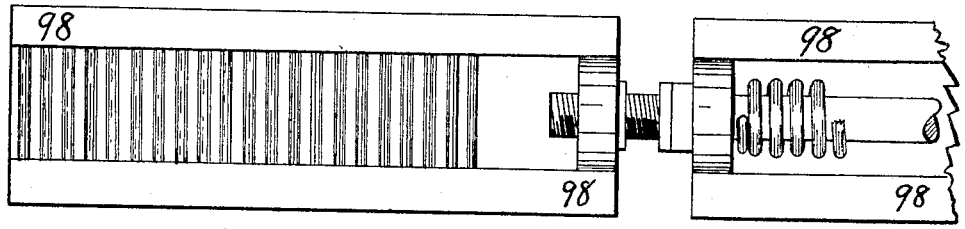
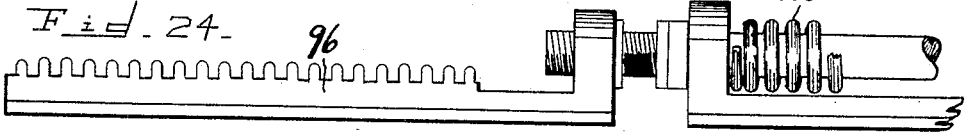
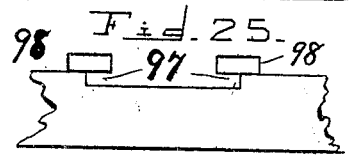
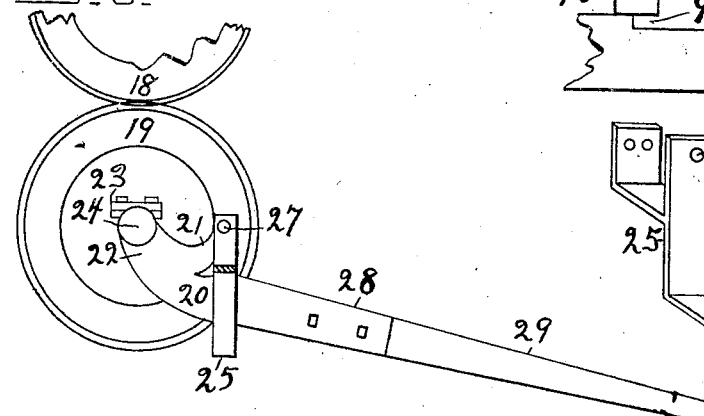
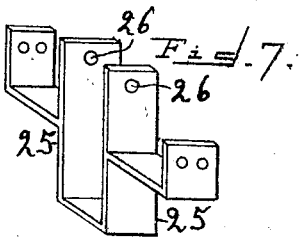
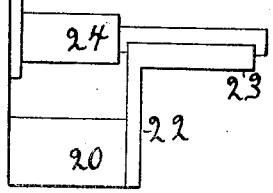
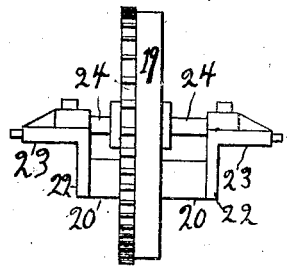
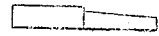
Witnesses: Arthur Sturges, Frank Quigley
Inventor: Gordon A. Rumbel
By Hiram A. Sturges, Attorney

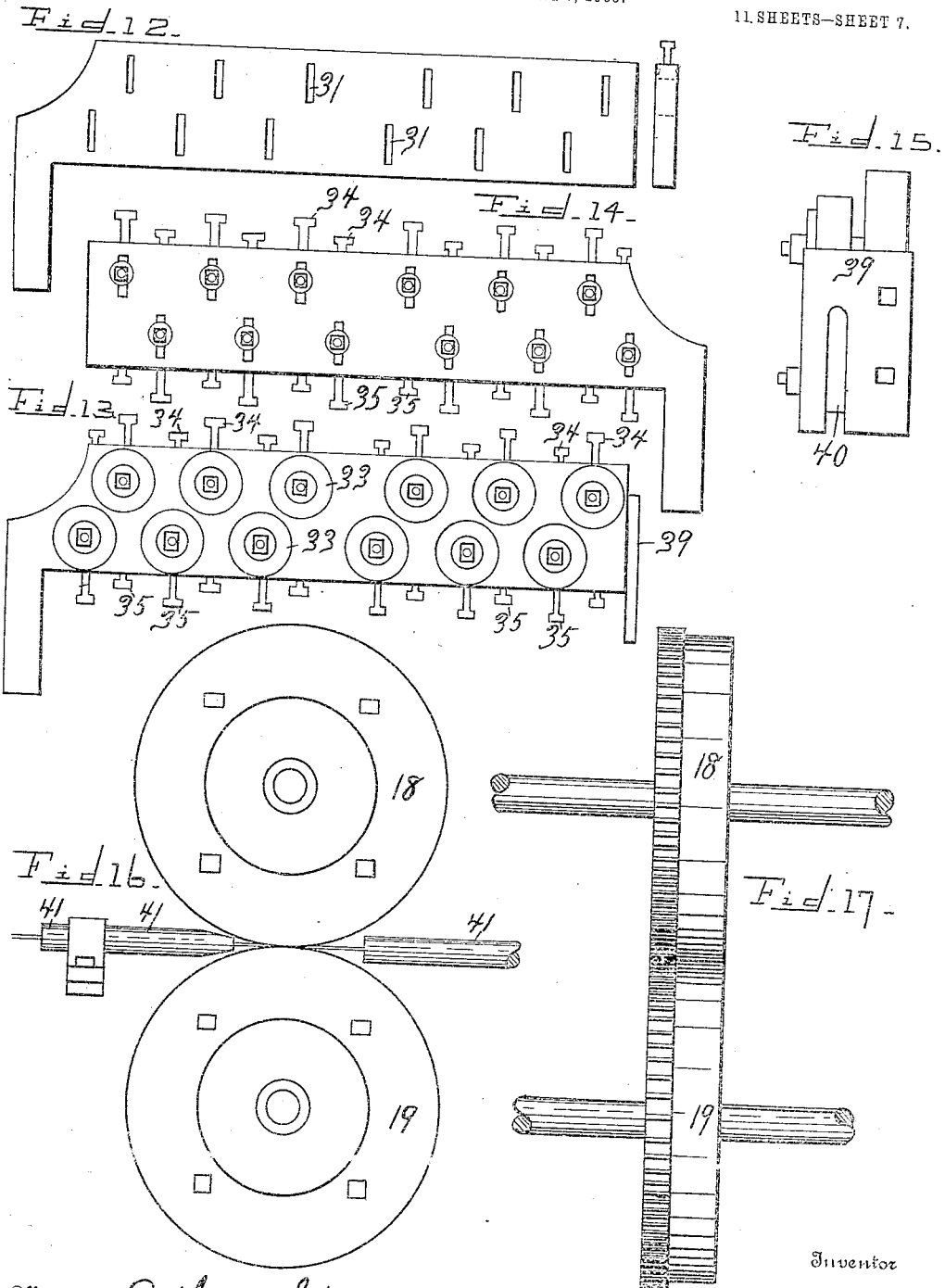

No. 816,381. PATENTED MAR. 27, 1906.
G. A. RUMBEL.
BALE TIE MACHINE.
APPLICATION FILED JULY 7, 1905.
11 SHEETS—SHEET 8.
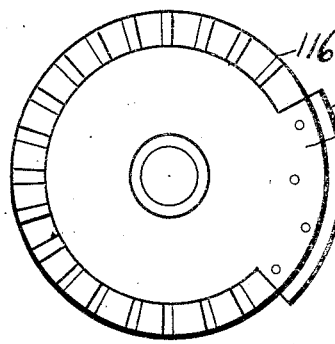
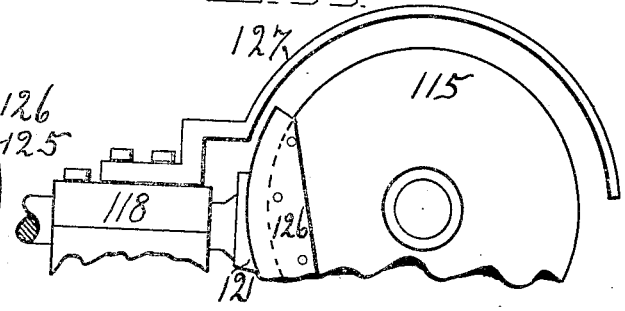
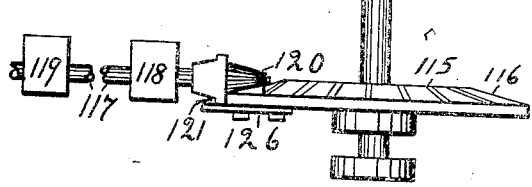
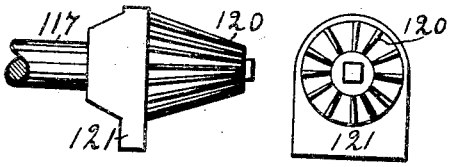
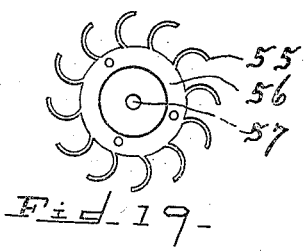
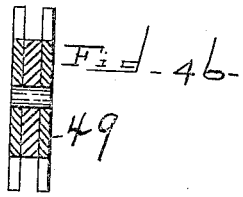
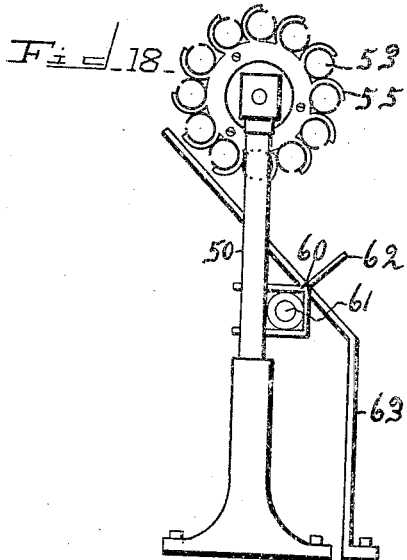
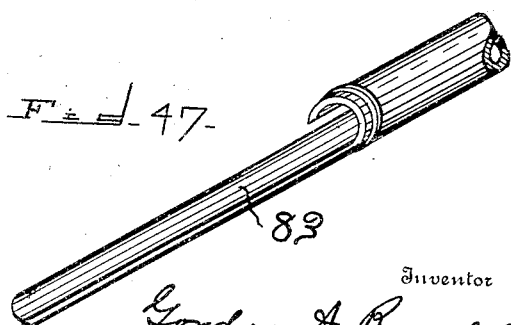
Witnesses
Arthur Sturges.
Frank Quigley
Inventor
Gordon A. Rumbel
By Hiram A. Sturges
Attorney

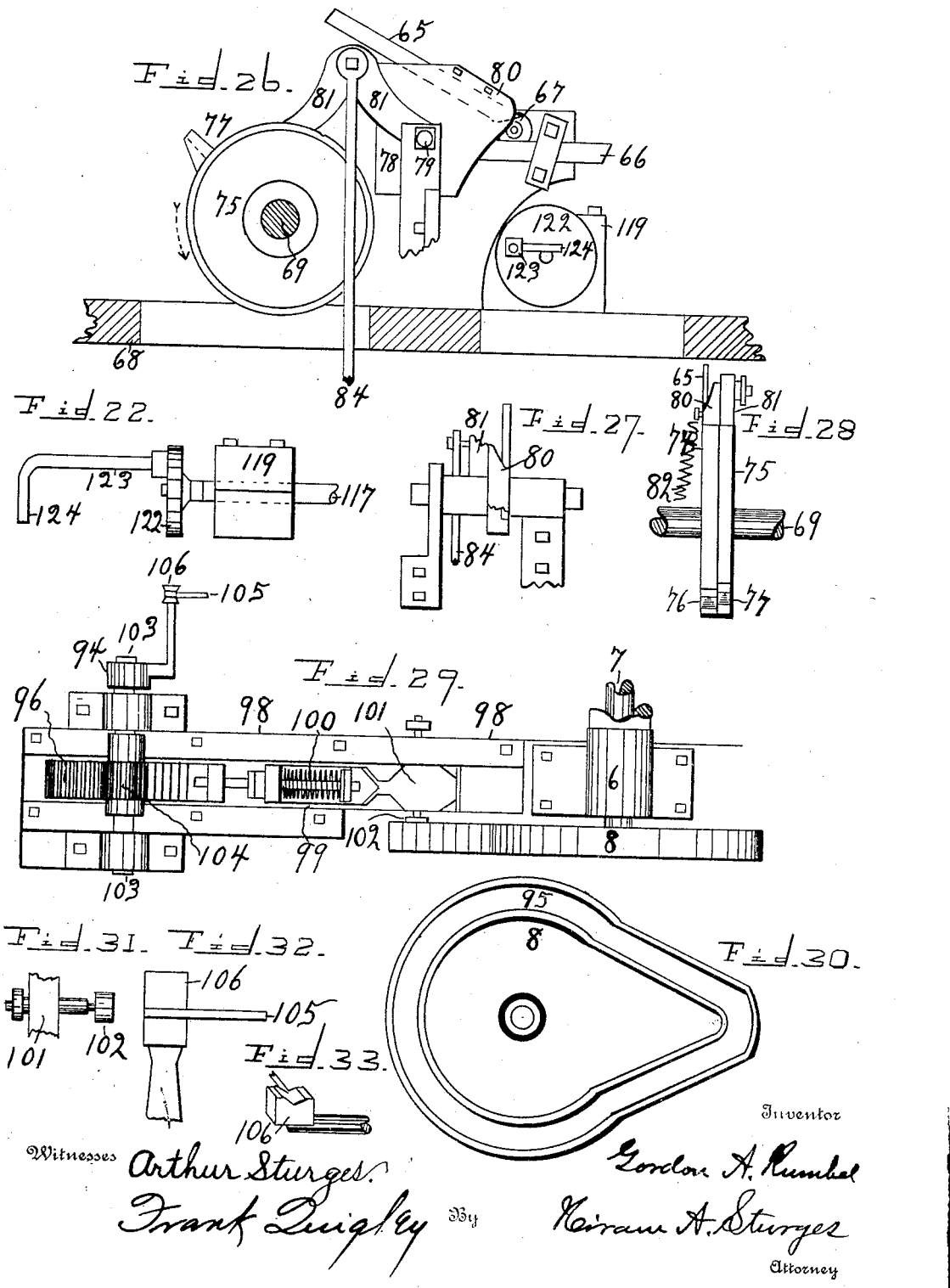

No. 816,381. PATENTED MAR. 27, 1906.
G. A. RUMBEL.
BALE TIE MACHINE.
APPLICATION FILED JULY 7, 1905.
11 SHEETS—SHEET 10.
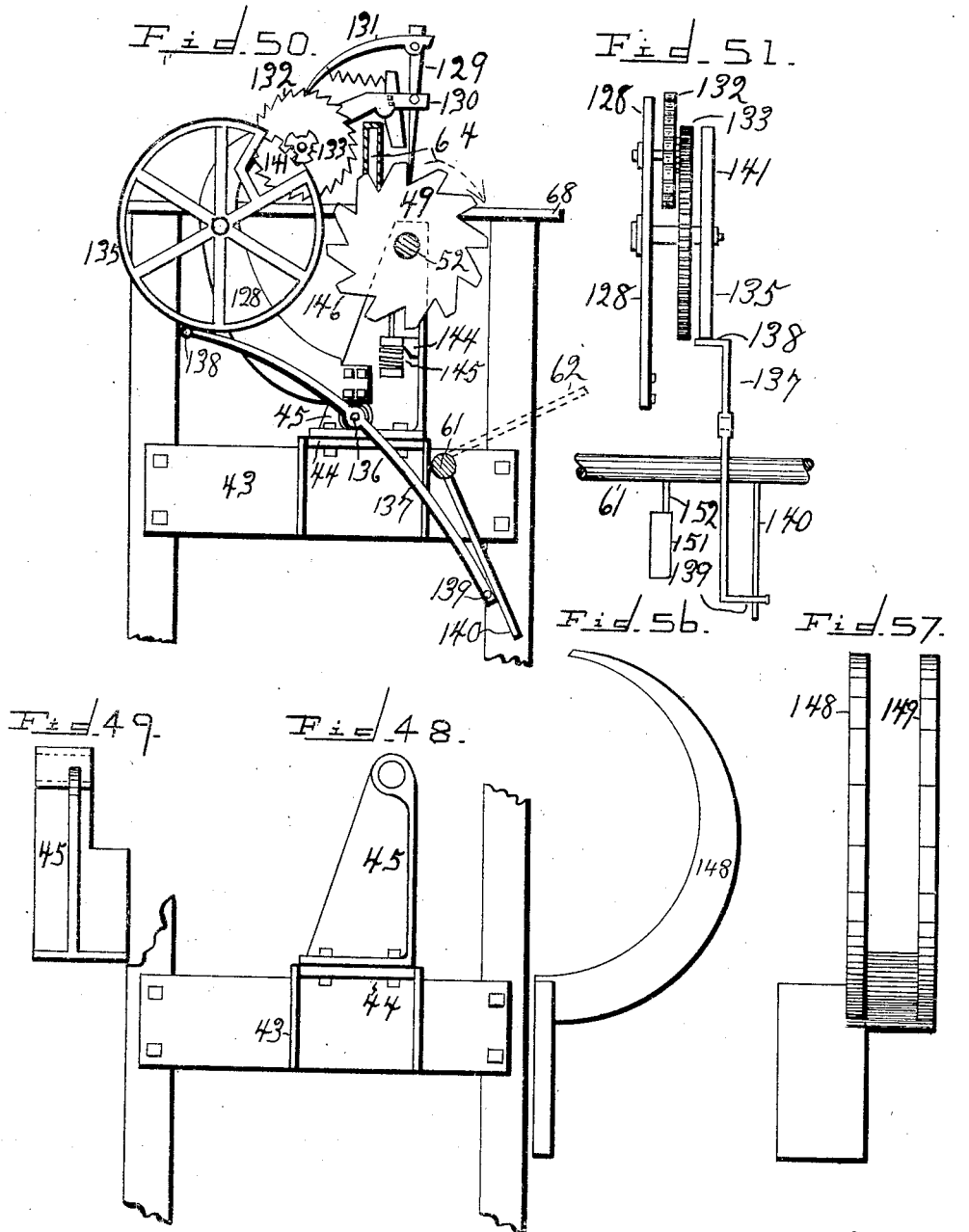

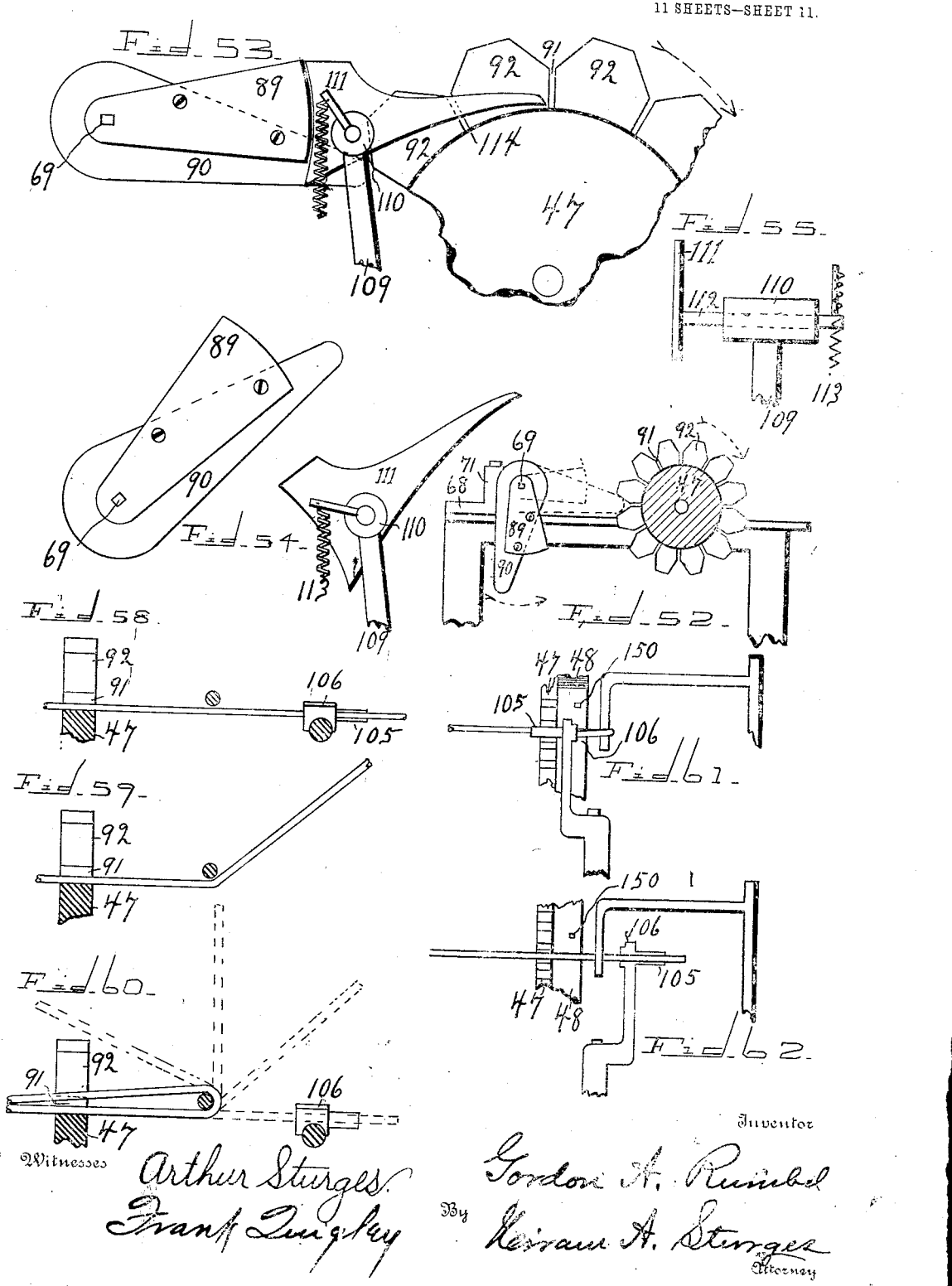

UNITED STATES PATENT OFFICE.

GORDON A. RUMBEL, OF OMAHA, NEBRASKA.

BALE-TIE MACHINE.

No. 816,381.   Specification of Letters Patent.   Patented March 27, 1906.

Application filed July 7, 1905. Serial No. 268,658.

*To all whom it may concern:*

Be it known that I, GORDON A. RUMBEL, a citizen of the United States, residing at Omaha, in the county of Douglas and State of Nebraska, have invented certain new and useful Improvements in Bale-Tie Machines, of which the following is a specification.

My invention relates to improvements in bale-tie machines adapted to manufacture wire bale-ties of any required length from wire-stock in the coil for use in baling hay or similar product.

The object of my invention is to present a complete bale-tie machine of fewest possible parts which may be constructed at very moderate expense, comparatively speaking, which will take control of wire from the coil, convey it to a cutting device, cut it into uniform lengths, form a twisted loop upon the end of each separate length of wire, and convey as well as deposit the manufactured bale-ties in counted lots ready to be made into packages.

My invention has for one of its objects the presentation of a ready means of adjustment to allow the cutting of longer or shorter lengths of the wire-stock; also, a means to prevent any misplacement or bending of the several bale-ties after they leave the cutting device while in process of counting, which will automatically count the ties in predetermined quantities for each bundle, which will cause crooked or bended wire to become straightened before being cut, and which presents a twister and loop-former simple in construction and effective in operation, and the presentation of resiliently-mounted parts of mechanism, all to be held in compact relative positions to not easily become out of repair, and which by a small degree of power will have a high efficiency of speed for the purposes required.

With these and other objects in view my invention presents a new combination and arrangement of parts, as described herein and as illustrated by the drawings, wherein—

Figure 1 represents a plan view showing the principal parts of my invention. Fig. 2 represents a vertical side elevation, parts being broken away to illustrate the principal parts not shown in Fig. 1. Fig. 3 is a vertical side elevation of Fig. 1. Fig. 4 is an opposite side elevation of Fig. 1. Fig. 5 is a vertical end view of my invention. Fig. 6 is a vertical sectional view of the frame on the line $a\,a$ of Fig. 1 to illustrate relative position of parts. Fig. 7 is a perspective view of supporting-framework. Fig. 8 is a side view illustrating the means for resiliently mounting one of the feed-wheels. Figs. 9, 10, 11 are details of Fig. 8. Fig. 12 is a vertical side view of the supporting-plate for wire-straightening mechanism. Fig. 13 represents a side elevation of the supporting-plate and straightening-wheels thereon. Fig. 14 illustrates means for adjustment and detention of the series of straightening-wheels. Fig. 15 is a detail of Fig. 14, showing the face of the wire-receiving block. Fig. 16 illustrates wire-feed wheels and relative parts, and Fig. 17 is an end view of the feed-wheels shown in Fig. 16. Fig. 18 represents an end view of Fig. 2 to illustrate the method of mounting tubes for tie conveying and dropping device and to illustrate tie-depositing means. Fig. 19 is a detail of Fig. 18, and Figs. 20 and 21 are enlarged details to illustrate construction of the tubes shown in Fig. 2. Fig. 22 is a side view of the twister, its disk, and shaft. Fig. 23 is a plan view of the rack. Fig. 24 is a side elevation of the rack, and Fig. 25 is an end view of the rack-holder or rack-track. Fig. 26 is a vertical sectional view of Fig. 1 on the broken line $b\,b$ to show relative position of disks, dogs, and cutting means. Fig. 27 is a vertical end view of parts shown in Fig. 26, and Fig. 28 is a plan view of the disks shown in Fig. 26. Fig. 29 is a plan view of the cam and mechanism connected therewith. Fig. 30 is a side view of cam to illustrate the contour of its interior groove. Fig. 31 is a detail of Fig. 29, showing cam-roller and its bearings. Figs. 32 and 33 are enlarged views of the loop-former. Fig. 34 is a face view of intermittent gear-wheel. Fig. 35 is a side elevation of intermittent gear-wheel and guard. Fig. 36 is a plan view of intermittent gear-wheel and pinion. Figs. 37 and 38 are details of Fig. 36. Fig. 39 represents the construction of one of the series of supporting-bolts for the mounting of straightening-rollers. Fig. 41 is a straightening-roller mounted upon its supporting-bolt, and Figs. 40 and 42 represent the washer and nut therefor. Fig. 43 is an enlarged face view of the wire-detaining head and separating-wheel. Fig. 44 is a sectional view of Fig. 43. Fig. 45 is a side view of a double conveying-wheel. Fig. 46 is a sectional view of Fig. 45. Fig. 47 is a perspective and enlarged view of one of the bisected tubes. Fig. 48 represents a front elevation of the standard, positioned upon its supporting-shelf. Fig. 49 is a side elevation of Fig. 48. Fig. 50 represents an end view of mounted computing devices. Fig. 51 represents a side elevation illustrating the principal parts shown in Fig. 50. Fig. 52 represents an end view of detaining-head to illustrate cam movement. Fig. 53 represents a part of the detaining-head and relative position of depressing-lever, also illustrates cam and arm actuating movement. Fig. 54 illustrates normal position of depressing-lever and cam and arm actuating movement. Fig. 55 is a side elevation of a part of Figs. 53 and 54. Figs. 56 and 57 are vertical side and end views of the tie-detacher. Figs. 58, 59, and 60 are vertical side views to illustrate the relative positions of the slot within the detaining-head, the twister-arm, and the loop-former and varying positions of wire. Figs. 61 and 62 illustrate the same.

I construct a suitable frame-body 1, of a generally rectangular form, supported upon legs of a convenient height and having strength to sustain the various shaftings, gearings, springs, and mechanisms employed, and journaled in suitable boxing at 2 upon the higher part of the frame is the shaft 3, which receives rotation from the pulley 4 from any source of power. Journaled in suitable bearings 5 and 6 upon the frame is the shaft 7, which causes rotation of the cam 8, positioned at one end, and the gear-wheel 9 at the opposite end of said shaft. Upon one end of shaft 3 is mounted the pinion 10, and I mount the intermediate idler-pinions 11 and 12 within the slot 13 of the lever 14, suitably journaled therein. The lever 14 is vertically and axially, but not rigidly, hung at its upper end upon and about the boxing 2 of the shaft 3. A curved slotted arm 15 extends from the lower part of the lever 14 lengthwise of the body of the machine, (shown best in Fig. 3,) the inner walls of the slot 16 resting upon the threaded compression-pin 17, slidably positioned upon the frame.

Near the longitudinal center of shaft 3 is rigidly mounted one of the feed-wheels 18, and below it and in vertical alinement therewith is the second feed-wheel 19, resiliently hung in a manner as follows: I construct the yoke 20, Figs. 1, 8, 9, and 10, provided with the arms 21 and 22, the arms 22 terminating in a boxing 23 to receive the trunnions 24 of the feed-wheel 19. Rigidly mounted upon the legs of the machine-frame (best shown in Fig. 5) is a framework, also shown in perspective by Fig. 7. The arms 25 pass upon either side of the feed-wheel 19, and the openings 26 are adapted to furnish a bearing for the trunnions 27 of the arms 21, Fig. 8. The yoke 20, with its arms 21 and 22, its shank 28, and extension 29, form a complete lever with fulcrum 27, Fig. 8, allowing a slight raising or lowering of the feed-wheel 19 by action of said lever, and the spring 30, which has a fixed bearing upon the floor or lower part of the frame, is a compression means to cause the raising of the feed-wheel 19 and causes its periphery to be pressed against the periphery of feed-wheel 18.

I construct a supporting-plate, Fig. 12, with a series of angular slots 31 therethrough and support it rigidly upon the arm 32 of the machine-frame for the purpose of sustaining in a fixed but adjustable position the series of supporting-bolts, Fig. 39, for wire-straightening rollers 33, held in true relative alinement and susceptible of adjustment to a suitable higher or lower altitude upon the plate by means of the threaded bolts 34 and 35, screwed downward or upward through the upper or lower edge surface of the plate. In order that the series of rollers 33 may have a true vertical as well as altitude alinement, I employ a series of bolts having angular seating-faces 36, Fig. 39, fitting within the adjacent vertical walls of the slots 31, and employ the integral collar 37 thereon, whose vertical walls present a true right angle to the riding-surface 38 of the bolt. The rollers 33 are provided with grooves near their periphery, and I employ a guiding-plate 39, Fig. 15, rigidly and transversely mounted upon the outer end of the supporting-plate, provided with the slot 40 to receive and guide the wire. Since the straightening-rollers 33 are mounted in true relative alinement, any crooked or bent wire coming from the coil-supply will be straightened during the passage of the wire through the grooves of these rollers. I construct the conducting-tube 41, one part thereof being secured upon the arm 32 of the frame, a like portion thereof being in alinement therewith and terminating in the boxed conductor 42, Fig. 4.

It will be understood that power applied to rotate the pulley 4 in the direction indicated by the arrow, Fig. 3, will cause a rotation of the feed-wheel 18 in the same direction. A portion of the peripheries of feed-wheels 18 and 19 have smooth corresponding surfaces adapted to come in frictional engagement with the lengthwise wire coming between them from the straightening-rollers, and they are also provided with intermeshing gears upon a portion of their peripheries, and a feeding movement is thereby established for the wire. Any flattening of the wire from this frictional contact is prevented by reason of wheel 19 being mounted upon the yoke 20 and the resilient operation of this spring 30, the upward pressure of the wheel 19 being no greater than the force exerted by this spring.

This invention does not include any means for regulating the longitudinal speed movement of wire except the conjoint movement of feed-wheels 18 and 19. The feeding of the wire continues at uniform speed so long as the gears of wheels 18 and 19 are in mesh. It is convenient, however, to cut bale-ties of various lengths, and my invention permits this variation, since an adjustment of lever 14 may be made and gear-wheels of greater or less diameters may be substituted for that of gear-wheel 9, and thereby the length of wire may be cut of correspondingly longer or shorter lengths, as desired, and the slotted arm 15, Fig. 3, will be shifted accordingly toward or away from shaft 7 to accommodate the change.

Rigidly upon the legs of the frame I construct the bracket 43 to support the shelf 44, Figs. 2 and 48, and upon the shelf 44 I construct, rigidly, the standard 45, adapted to sustain the shaft 52, suitably journaled in the boxing 46 upon its upper end. Upon one end of shaft 52 I rigidly place the detaining-head 47 and its companion separating-wheel 48, and adjacently thereto I rigidly place the double conveying-wheel 49.

I construct the supporting-leg 50, secured in a suitable manner to the floor, with suitable boxing 51 at its upper end to contain the horizontal shaft 52, and I construct a series of tubes 53 with their guards 54, these tubes being mounted at equal radial distances from a common center and held rigidly in their relative positions and equally spaced apart by means of the curved arms 55. The tubes thus constructed and mounted are for the purpose of aiding in the lengthwise support of the wire-stock before it has been cut, of confining the wire and bale-tie while and after being cut, and of preventing misplacement of the manufactured bale-tie until it has been conveyed, counted, and finally deposited. I find it convenient to construct this series of tubes in comparatively short sections and mount them as a unit upon the shaft 52, and this is accomplished by a simple casting of a central body-portion 56, Fig. 19, with the integral arms 55, the latter being adapted to overlap the series of tubes and to afford a rest for the tube ends. The opening 57 is adapted to receive the shaft 52, and the body portion 56 is rigidly mounted thereon, and the end of each tube 53 is made integral with the arm 55, as by soldering the parts. Each tube 53 has a slot or opening 58 extending lengthwise of its body, and each tube is mounted so that the slot is in alinement with the radial space appearing in front, radially considered, of each arm 55, and after mounting the tube within each arm I construct the guard 54, one end of said guard being integral with the tube and the opposite end of the guard overlapping that part of the arm which protrudes beyond the periphery of the tube. The first section, or that section situated nearest the principal part of the machine, differs from any other section, since the outer half of each tube is entirely removed and the place of each tube appears as an open trough 83, Fig. 47. I employ twelve of the radially-disposed tubes 53 for each section. The number, however, may be varied, and the number of radially-set troughs or longitudinally-bisected tubes constituting the first section will always correspond to the number of tubes of each section. The open portion of the troughs 83 answers the function of the otherwise slot 58 for the first section, and the slot 58 is continuous throughout the entire length of the series of sections.

Upon the supporting-leg 50 I place the staple 60, Fig. 18, as a support for one end of the horizontal shaft 61, the opposite end of said shaft being supported upon the bracket 43 within suitable bearings. The shaft 61 is provided with tie-supporting arms 62, set integrally thereon upon the same radial plane, and passing downward beneath the series of tubes 53 and above the shaft 61 is an oppositely-disposed series of supporting-arms 63, secured rigidly to the floor, and as thus constructed the openings or slots 58 in the series of tubes of each section, as well as the curved troughs 83 of the first section, are in alinement, and no obstruction is offered to the lengthwise passage of wire therein.

A guide-chamber 64, Fig. 3, effects a junction with the boxed conductor 42, and it is gradually reduced in size as it approaches its opposite open end, terminating closely adjacent to the first section of tubes 53 above mentioned and in vertical alinement with next to the uppermost of said tubes. The guide-chamber 64 has closed sides and roof, but has no floor, and its sides and gradually-receding roof extend slightly above but closely adjacent to the troughs 83 next to the uppermost.

The cutting of the wire is effected by means of the upper movable shear 65 coming in contact with the stationary shear 66 at the orifice 67, Fig. 26, of the boxed conductor 42. By action of the feed-wheels 18 and 19 the wire is drawn into the conducting-tube 41 from the outside coil-supply and by the same agency is pushed forward into the guide-chamber 64 and along the one of the series of troughs 83 into next to the upper one of the series of tubes 53 to a predetermined distance, (depending upon diameter of gear-wheel 9,) at which time the wire is cut from the wire-stock by action of the shears. Immediately after the cutting occurs the length of wire which has been severed is manufactured into a bale-tie and handled in a manner hereinafter described.

I will now explain the function of tubes and other devices employed as conveying means.

The shaft 52 has several devices rigidly mounted thereon and imparts a common radial movement to the separating-head 48, the detaining-head 47, the conveying-wheel 49, the section of troughs 83, as well as the several sections of tubes 53 in the direction indicated by the arrow in Fig. 18, since these devices are made rigid with said shaft, and the speed of this revolving movement is timed in a manner so that the tube next to the topmost receives a wire the instant before the wire is cut and twisted into a bale-tie. The conveying-wheel 49 is constructed as a double wheel, Figs. 2, 45, and 46, and they each are provided with similar broad teeth or blocks 107 upon their periphery and similar deep grooves 108 descending toward their centers, the advancing walls of the several grooves being set upon the radii and the opposite walls receding. The lower points of the grooves of this double wheel are in alinement with the inner surface of the series of troughs and tubes, so that the wire when cut and twisted rests upon these surfaces, and the wire at this time also rests within the slot 91 of the detaining-head, Fig. 43, and at the time the twisting of the wire occurs the cut length of wire is resting within the uppermost slot of the detaining-head 47, as well as in the uppermost trough and tube, they all being in true alinement, and the wire remains in that position while the twisting occurs, after which, the shaft 52 having rotated a sufficient distance to cause the adjacent tube to make a radial presentation in alinement with guide-chamber 64, another cutting of wire occurs, and in this manner the tubes, troughs, conveying-wheels, detaining-head, as well as separating-wheel 48, move radially and in unison in the direction indicated, carrying in each respective descending tube, trough, groove, and slot a manufactured bale-tie, the radially-ascending tubes, troughs, grooves, and slots being empty, and each bale-tie in turn drops from the slot 52 of the tube 53, as well as from its other surface supports just mentioned, and falls by its own weight upon the transversely-disposed supporting-arms 62 and 63, Fig. 18, and by this radial arrangement and movement the bale-ties are conveyed and deposited in a manner to prevent misplacement or bending of the wire-stock. The guards 54 prevent any interruption to the forward passage of wire-stock, and when from vibration, oscillation, or accidental tilting of the free end of the wire-stock during its forward passage it passes out of the slot 58 the guard 54 has a tendency to cause the wire to return to the slot, since the form of the guard at its enlarged portion increases the otherwise diameter of the tube on which it is placed, and while this enlarged portion offers no obstruction to the forward passage of wire it forms a gradually-raised radial surface adapted to prevent a movement of wire in any other direction, longitudinally speaking, than toward the slot 52. The guard 54 also covers the periphery of the curved arm 55, preventing any obstruction from that source to the forwardly-passing wire.

I employ the bed-plate 68 and bolt it upon the frame for the purpose of locating thereon the several devices employed for cutting and twisting the wire. Upon the bed-plate 68 I place the shaft 69, journaled in its bearings 70 and 71, Figs. 1 and 3, and upon the shaft 7 I place the miter-gear 72, adapted to mesh with the gear 73 of shaft 69, and I mount the double disks 74 and 75 thereon, carrying, respectively, the lugs 76 and 77, Figs. 3, 26, and 28.

I construct rigidly upon the bed-plate 68 the anchor-piece 78 and pivotally mount thereon at 79, Fig. 26, the dog-levers 80 and 81, Figs. 1, 3, 4, 26, 27, and 28. The free end of the dog-lever 80 is forced downward upon the disk 74 by action of the spring 82, Figs. 3, 4, 5, 28. The free end of the dog-lever 81 is forced down upon disk 75 by action of the spring 30, Fig. 6, and it will be understood that as these disks revolve in a direction indicated by the arrow, Fig. 26, the slanting side of the lugs make contact with the lower ends of the dog-levers, forcing the latter upward, and the upward movement of the free end of dog-lever 81 causes the rod 84, Figs. 3, 6, 26, to be raised. The rod 84 terminates as an angular frame 85, Figs. 3 and 6, and sustains one end of the lever 86, the opposite end of said lever being pivotally hung on the leg at 87. Lever 29 rests upon lever 86, and it is obvious that as the lug of disk 75 raises the dog-lever 81 and as the rod 84 is raised thereby lever 29 is also raised, which lowers the engaging wheel 19, and the forward movement of the wire ceases in consequence thereof. In other words, forward movement of the wire ceases because pressure at the periphery of the feed-wheel 19 is removed from the wire, and the meshing of feed-wheels 18 and 19 is no longer established after feed-wheel 19 has been dropped to lower planes by raising of lever 29, brought about by the lug 77 of disk 75 coming in contact with dog-lever 81.

It will be understood that disks 74 and 75 are constructed integral and move in unison upon their common shaft 69 and have the same diameters, and it is important that the wire shall come to a position of rest before being cut. My construction provides for the variation in movement necessary for this purpose, as will be explained in this and the succeeding paragraph. While these disks have the same diameters and move in unison, their respective lugs occupy slightly-different positions, radially considered, upon the peripheries of the disks, which results in raising dog-lever 81 an instant sooner than dog-lever 80 is raised. While the two dog-levers have the same pivotal bearing, they act independently of each other. The face of dog-lever 80 occupies a less radial space upon the disk than does dog-lever 81. The latter is first to reach its lug, and thereby causes the forward movement of the wire to cease an instant before the cutting of the wire occurs. At the moment the forward motion of the wire ceases the shear-arm 65 is swept downward, since it is integral upon the back of dog-lever 80, and in moving downward makes contact with the shear-arm 66, Fig. 26, thereby cutting the wire. Dog-lever 80 is sooner to act, because it has a less space upon the disk, as shown by the broken lines in Fig. 26. Also the lug it makes contact with has a less peripheral face than lug 77. While dog-lever 81 is first to be raised, it is last to leave its lug, and by the arrangement and construction above described the forward movement of wire is arrested momentarily and the cutting of the wire is effected, and, as is evident, one length of wire is cut at each joint revolution of the disks 74 and 75.

I mount rigidly the cam 90 upon the end of the shaft 69, Fig. 3, and rigidly upon the side of the cam 90 I mount the arm 89, both having a slow-moving radial sweep, and upon the standard 45 I rigidly mount the sustaining-arm 109, which terminates in a bearing-head 110, which incloses the depressing-arm 111, Figs. 53, 54, 55.

I provide the transversely-formed slot 88 upon the guide-chamber 64, Fig. 4. The depressing-arm 111 is constructed integral with its shaft 112, Fig. 55, and its normal position is an upward incline, as shown in Fig. 54, by reason of the action of spring 113. The upward sweep of cam 90 causes its free end to come in engagement with the blocks 92 of the detaining-head 47, thereby actuating its shaft 52, Fig. 2, and causing it to rotate in the direction indicated by the arrow, Fig. 53, and by the same upward sweep of cam 90 the arm 89 thereon makes contact with the curved base of the depressing-arm 111, throwing the latter forward, so that it passes with a sweep within the slot 88, Fig. 4, at the moment when the length of wire has been cut, pressing downward the severed wire length 114 within the slot 91, thereby causing the end of the wire to be positioned upon the grooved head 106 of the loop-former 94, (shown in Figs. 29, 32, and 62,) the operation of forming the wire loop to be hereinafter explained.

Upon the shaft 7 I mount the cam 8 with its groove 95, Figs. 1, 29, 30, and upon the bed-plate 68 I construct the rack 96, adapted to slide horizontally within the extending track or slot 97, formed within the bed-plate, Fig. 25, and confined beyond vertical movement by the straps 98, secured to the bed-plate. The rack is adapted to have a horizontal movement within its track and is connected with the yoke 99, Fig. 29, containing the spring 100, the yoke 99 terminating in the head 101, the latter furnishing the inclosed bearing for the cam-roller 102, Fig. 31. The roller 102 fits within the groove 95 of the cam 8, Fig. 30. I construct the shaft 103 suitably journaled upon the bed-plate 68 and mount thereon the pinion 104, adapted to engage the rack 96, and upon the end of shaft 103 I rigidly mount the loop-former 94. The loop-former 94 has an enlarged body adapted to be fitted upon its shaft, a shank extending parallel with its shaft, but radially distanced therefrom sufficient so that the finger 105 of its grooved head 106 will make contact during a part of its radial swing with the slot 91 of the detaining-head 47, Figs. 46, 61, and 62.

It will be understood that the cam 8 causes the forward and backward movement of the rack by action of the cam-roller 102 within the cam-groove 95 and that when the cam revolves in the direction indicated by the arrow, Fig. 4, there is no movement of the rack or loop-former while the roller is engaged by the circular portion of the groove, but when the elongated portion of the groove makes contact with the roller sliding of the rack is effected, followed by an interval of rest, after which the rack is again moved upon its track in a direction backward or toward the cam. The pinion 104 is rotated upon its shaft by action of the rack. As the rack moves in a direction away from the cam the loop-former is partly rotated, so that its angular shank is turned to assume a position shown in Fig. 29. The loop-former 94 then remains in a position of rest, while the cam-roller 102 remains within the rounded portion of the groove 95, Fig. 30. Upon the continued rotation of the cam, the rack 96 is drawn in the direction of the cam, by which action the loop-former performs about one-half of a revolution, and by an upward swing covering about the upper half of a circle causes its finger 105 to contact within the slot 91 of the detaining-head 47, Figs. 2, 46, 61, 62. The head 106 of the loop-former 94, as well as its finger 105, has recessed face-walls, as illustrated by Figs. 32 and 33, adapted to receive and retain the wire. The spiral spring 100 within the yoke 99 is a resilient means to prevent undue vibration of shaft 103, upon which the loop-former is mounted.

Rigidly upon the shaft 7 I mount the intermittent gear-wheel 115, Figs. 1, 5, 34, 35, provided with inclinedly-set teeth 116 for about three-fourths of its face circumference, the remaining one-fourth of its rim being a smooth surface, and rigidly upon the back of the wheel adjacent to the blank surface and extending slightly beyond its periphery is the curved plate 126. I place the shaft 117 in suitable boxing 118 and 119, and rigidly upon the end of the shaft 117 is the beveled pinion 120, the teeth of which make engagement with the intermittent gear just described. The pinion 120 is provided with an angular and integral collar 121, Figs. 36, 37, 38, and rigidly upon the opposite end of shaft 117 I mount the disk 122, upon which, near its radial edge, I rigidly mount the wire-twister 123, Figs. 1, 4, 22, 26. The twister 123 is constructed with an arm extending forward parallel with its shaft, but not in alinement therewith, and is provided with a hooked end 124, formed at a right angle with its shank and extending parallel with the face of the disk 122 and passes slightly past its center, Fig. 22. It will be thus understood that the revolving movement of shaft 7 in one direction causes the twister-shank to revolve so long as the teeth 116 of gear 115, Figs. 34, 36, make contact with the pinion 120, but that when the blank surface 125 is reached the wall of the rim 126 engages the angular wall of the collar, Figs. 37, 38, and the shaft 117 remains at rest while the rim 126 is in engagement with the collar 121, and in this manner the twister has an intermittent rotary motion. I construct a curved outer cover 127 extending closely above and closely adjacent to the upper periphery of gear-wheel 115, as well as to the pinion 120, Fig. 35, rigidly positioned upon the boxing 118, which protects these gears from making contact with any moving or stray wires.

I construct mechanism for computing the number of bale-ties for each bundle by use of devices as follows: Upon the standard 45 I rigidly mount the curved sustaining-arm 128, which extends outward and upward with a returning curve to the guide-chamber 64, this sustaining-arm being strongly constructed and mounted, so as to sustain the several devices in an operative position which are placed thereon. The computing-lever 129 is pivotally hung at its center upon the sustaining-arm at 130, and at its upper end I pivotally and resiliently mount the plunger 131, the free end of which rests between the teeth upon the periphery of disk 132. I have already explained that the shaft 52, upon which the conveying-wheel 49 is mounted, receives actuation and is driven in the direction indicated by the arrow, Figs. 50, 52. The conveying-wheel 49 is composed of two sections, Fig. 46, and the lower end of the computing-lever rests between the sections of the uppermost teeth, and when a wire length is cut it at once drops from the guide-chamber 64 between the teeth of the conveying-wheel and is carried forward radially against the lower end of the computing-lever presently with sufficient force to cause the upper end to actuate the plunger 131, causing it to be driven against the teeth of disk 132. Disk 132 is sustained by its pivotal bearing on the curved sustaining-arm 128 and is provided with a gear 133 at its center. Gear-wheel 134, Figs. 3, 51, also is sustained and has a pivotal bearing upon the curved sustaining-arm 128, and its peripheral gear makes contact with gear 133 and is actuated thereby. Rigidly with gear-wheel 134 and closely adjacent thereto and of similar diameter thereto is constructed and mounted the blank wheel 135, it being a companion wheel to gear-wheel 134 and pivotally hung therewith. Suitably boxed upon the standard 45 I pivotally mount at 136 the curved lever 137, provided with its transversely-formed ends 138 and 139, Figs. 50, 51, the end 138 so positioned as to have a bearing on the face rim of the blank wheel 135, its opposite end 139 making contact with lever 140, integrally attached to shaft 61, Fig. 2. A part of the periphery of blank wheel 135 is mutilated, and an angular space 141 is thereby formed. As bale-ties are successively formed they drop upon the supporting tie-arms 62 of shaft 61, Figs. 2, 50, as has already been explained. The weight thus sustained is considerable, and a downward pressure is thereby created. It will be understood that the rotation of the conveying-wheel 49 causes the wire lengths which lie within the grooves between its teeth to actuate the computing-lever 129, which causes the plunger 131 to rotate the disk 132, and each movement of the computing-lever 129 allows one wire length to pass its lower point, at which time and by which action one count is made upon disk 132, and at each revolution of gear-wheel 134 the arm 138 of lever 137 drops within the space 141 of the blank wheel 135, thereby causing the lower arm 139 of lever 137 to drop downward, which throws the accumulated bale-ties off from the supporting tie-arms 62 as a deposit, and the number of bale-ties thus deposited will always be uniform for each revolution of gear-wheel 134, as is evident. In order that lever 61 may be restored to its former radial position to that occupied by it before depositing its counted accumulation of bale-ties, I employ a weight 151, attached to the arm 152, Fig. 51. The upward force exerted by the cam 90 upon the blocks 92 to rotate the detaining-head 93 upon its shaft 52, Fig. 52, is considerable. The tendency of the stroke of the cam is to cause more or less vibration of shaft 52 on its bearings within standard 45; also there is a tendency of the cam movement to propel shaft 52 a greater radial space than a single tooth upon either the detaining-head or conveying-wheel. A governor or brake is therefore necessary to control the measurement of rotation of shaft 52 for each stroke of the cam 90, and I provide this brake by means of the steel compression-strap 142, which is rigidly positioned upon the standard 45 at 143, Fig. 4, and it passes over the rounded top of standard 45, the other end being resiliently mounted upon the opposite side of the standard, Fig. 50, by means of the bracket 144, the coiled spring 145, and rod 146, to which the strap is attached.

In order that bale-ties may be detached with certainty from the detaining-head 93, I construct the tie-detacher 147, Fig. 4, also illustrated by the entire Figs. 56 and 57. This device has a cycle-shaped form, its base being rigidly positioned upon the side of standard 45, vertically placed, its curved arms 148 and 149 passing upon either side of the detaining-head 47. As the finished bale-ties are successively conveyed downward they come in contact with the outwardly-curved portions of the arms and are dislodged from the slots 91 of the blocks 92 of the detaining-head.

The separating-head 48, Fig. 44, assists in preserving alinement of the wire and wire loop between the detaining-head and twister, and in order that the wire loop may be removed from the end of the twister after the wire has been twisted I radially mount upon the separating-head the series of fingers 150, Figs. 43, 44, closely adjacent to the slots 91. The movement of the twister ceases at a time when its angularly-extending end points in the direction toward shaft 103, Fig. 1, the operation of twisting the wire having been completed, and the radially-moving shaft 52 carries the separating-head forward, the finger 150 carrying with it radially the twisted loop from the open end of the twister. As a rule the slot 91 would perform the function of the finger 150; but the wire or wire loop is not always perfectly straight and the usefulness of the finger is largely depended upon where the wire is not perfectly straight.

Having described the operation of parts and their functions while passing, any detailed description relating to operation is not now required, and it will be sufficient to say that bale-tie-wire stock is drawn into the machine through the series of straightening-rollers 33 by frictional contact upon the wire of feed-wheels 18 and 19. The movement of the wire is in a straight course. It is moved forward by this force through the conducting-tube 41, the boxed conductor 42, and guide-chamber 64 into a tube 53 to a selected distance, that distance being regulated by the diameter of adjustable wheel 9. The cutting occurs at the orifice 67, vertically adjacent to the shears. At the time of cutting the wire rests within one of the tubes 53 next to the uppermost tube. The cutting is effected by means of dog-lever 80 being raised by the lug 76 of disk 74. At the moment of cutting the wire has ceased its forward movement by reason of removal of pressure of feed-wheel 19 from the wire through operation of dog-lever 81 being raised by lug 77 of disk 75. At the moment the wire is cut the latter is pressed downward through the open floor of guide-chamber 64 by operation of the depressing-arm 111, and simultaneously with this movement shaft 52 is rotated sufficiently to cause the tube which confines the wire to pass to the topmost position of the tube series, and by this movement in unison with the alining topmost trough 83 and corresponding block of the detaining-head the end of the severed wire falls within the grooved head 106 of the loop-former, Fig. 62, which at this instant is in a position of rest in its position farthest away from the detaining-head, and at this time the angular end 124 of the twister positions itself so that it lies immediately above the wire in a position of rest, Figs. 58, 62. The loop-former then performs an upward circular sweep, carrying within the grooves of its head the end of the wire over the angular intervening end of the twister and deposits the wire within the slot 91, Figs. 58, 59, 60, 61, 62, of the detaining-head. The loop having thus been formed, the finger 105 of the twister presses downward upon the extreme end of the loop within the slot 91, Fig. 61, and continues the pressure until the twister, actuated by its intermittent gear, (its angular end 124 being still within the loop,) rotates in common with its disk several revolutions, thereby twisting the wire and completing the loop. While this action is taking place wire stock is passing again within the machine in the same manner as described for the cutting of another length. The vertical plane occupied by the incoming wire stock and its alining receiving devices is immediately and radially adjacent to the plane occupied by the loop-former, twister end, and alining devices therewith, and the change from one radial operating plane to the other adjacent operating plane is effected by the radial movement of shaft 52. The radial movement of shaft 52 is caused by the contacting sweep of cam 90 upon one of the teeth of the detaining-head 47, and the distance of this radial movement of shaft 52 is governed by the tension of the strap 142, so that the movement is confined to a distance equal to a measurement from one to another of the slots 91 of the detaining-head. The mechanism is so nicely adjusted and timed that all of the parts cooperate instantaneously, so that bale-ties are rapidly cut, looped, twisted, counted, conveyed, and deposited, the capacity being from thirty to thirty-two per minute in lengths varying from seven to eight feet, as predetermined. The intermittent gear which has been described causes the twister to assume a position of rest with its free end pointed to the horizon toward shaft 103 of the loop-former as soon as the cut length of wire has dropped within the head-grooves of the loop-former, and it does not commence a twisting movement until the loop has been formed. The groove of cam 8 is constructed to actuate the rack and loop-former, so that the movement of the latter will cooperate with that of the twister, and the cams 74 and 75, their lugs and dog-levers 80 and 81, which control the stop movement and cutting of wire, are constructed so that their movements will cooperate with the movement of the loop-former and twister, so that the cutting will occur at a time when the head of the loop-former is in a position of rest in the position farthest away from the detaining-head, where it will receive within it grooves the severed length of wire. The means for receiving the wire stock and for radially conveying and depositing the bale-ties, as well as computing means and the function and operation of each, have already been fully described.

What I claim as my invention is—

1. A bale-tie machine comprising mechanism adapted to convey wire stock within the machine, means for severing the wire stock into wire-blanks, in combination with a revoluble detaining-head, a series of radially-disposed slots therein, a wire-twister, a wire-loop former adapted to receive, convey and confine an end of wire-blank within said slots; said wire-twister being adapted to twist said end of wire-blank while thus confined within one of said slots.

2. A bale-tie machine comprising mechanism adapted to convey wire stock within the machine a predetermined distance, means for severing the wire stock into wire-blanks, in combination with a revoluble detaining-head, a series of radially-disposed slots therein, a wire-twister, a wire-loop former adapted to receive, convey and confine an end of wire-blank within said slots; said wire-twister being adapted to twist said end of wire-blank while thus confined within one of said slots.

3. A bale-tie machine comprising mechanism adapted to convey wire stock within the machine a predetermined distance, means for severing the wire stock into wire-blanks of varying lengths by means of adjustment-gears of varying diameters, in combination with a revoluble detaining-head, a series of radially-disposed slots therein, a wire-twister, a wire-loop former adapted to receive, convey and confine an end of wire-blank within said slots; said wire-twister being adapted to twist said end of wire-blank while confined within one of said slots.

4. A bale-tie machine comprising a feed-wheel adapted to rotate upon a fixed axial plane, a second feed-wheel adapted to make intermittent peripheral contact therewith, means for lateral conveyance of wire within the machine a predetermined distance, means for cutting the wire stock into blanks of predetermined varying lengths, in combination with a series of slots upon a revoluble detaining-head, a loop-former adapted to contact, consecutively, with said slots, and means for twisting one end of a wire-blank while confined within the slot.

5. A bale-tie machine comprising wire-cutting means consisting of a stationary member and a cam-actuated member, means for causing wire to be drawn within the machine a predetermined distance before being cut, a loop-former adapted to form a loop upon the end of a wire, a revolving twister adapted to twist a wire loop, a revolving detaining-head, and a series of rotating receptacles adapted to contain the wire before and after the wire is cut into lengths; said loop-former being adapted to make contact with the wire loop upon the detaining-head, at which time the twister rotates to form the twisted loop.

6. A bale-tie machine comprising wire-cutting means, consisting of a stationary member and a cam-actuated member, means for causing wire to be drawn within the machine a predetermined distance before being cut, a loop-former adapted to perform a reciprocated rotary movement on its shaft and form a loop upon the end of a wire, a twister adapted to have an intermittent rotary movement to twist a wire loop, a rotating detaining-head, and a series of rotating receptacles adapted to contain wire before and after the wire has been cut; said loop-former being adapted to make contact with the wire loop upon the detaining-head at which time the twister rotates to form the twisted loop.

7. A bale-tie machine comprising means for twisting a wire loop consisting of an angularly-formed arm adapted to have periodical rotation, means for forming a wire loop consisting of an angularly-formed arm adapted to have reciprocated rotation; means for cutting wire into lengths consisting of a stationary member and a cam-actuated member; the angular arm for said twisting means being adapted to detain the wire length while the angular arm for said loop-forming means performs its rotary movement.

8. A bale-tie machine comprising means for twisting a wire loop consisting of an angularly-formed arm adapted to have periodical rotation, means for forming a wire loop consisting of an angularly-formed arm adapted to have reciprocated rotation; means for cutting wire into lengths consisting of a stationary member and a cam-actuated member; the angular arm for said twisting means being adapted to detain the wire length while the angular arm for said loop-forming means performs its rotary movement; in combination with a shaft, and a series of receptacles longitudinally and radially disposed thereon.

9. A bale-tie machine comprising means for twisting a wire loop consisting of an angularly-formed arm adapted to have periodical rotation, means for forming a wire loop consisting of an angularly-formed arm adapted to have reciprocated rotation; means for cutting wire into lengths consisting of a stationary member and a cam-actuated member; in combination with a shaft, a detaining-head thereon, a series of receptacles longitudinally and radially disposed thereon; the angular arm for said twisting means being adapted to detain the wire length while the angular arm for said loop-forming means performs its rotary movement; said shaft being adapted to rotate in one direction causing rotation of said detaining-head and series of receptacles, and said angular arm for loop-forming means being adapted to make contact with the detaining-head at the time the angular arm for the twisting means performs its rotation.

10. A bale-tie machine comprising a twister having an angularly-formed arm adapted to have a periodical rotation; a wire-loop former having an angularly-formed arm adapted to have reciprocated rotation; means for cutting wire into lengths consisting of a stationary member and a cam-actuated member, in combination with wire-feeding mechanism, wire-straightening mechanism, a series of receptacles adapted to contain wire before and after it has been cut into lengths, a wire-detaining head and a revoluble shaft, said detaining-head and series of receptacles to be disposed upon said shaft and to receive rotation thereby; the angular arm of the twister being adapted to detain the wire length while the angular arm of the loop-former performs its rotation; the angular arm of the loop-former being adapted to make contact with the detaining-head while the angular arm of the twister is performing its rotation.

11. The combination of a rotating twister having a shank portion, and transversely positioned thereon a wire-contacting portion, a rotating loop-former having a shank portion and transversely seated thereon a wire-receiving portion, a revoluble detaining-head and radially-disposed slots thereon, wire-feeding mechanism and wire-cutting mechanism; said loop-former being adapted to make contact upon the slots of the detaining-head at which time the twister rotates to form the twisted loop.

12. The combination of a rotating twister having a shank portion and transversely positioned thereon a wire-contacting portion and mechanism for delivering the wire upon the wire-contacting portion; a rotating loop-former having a shank portion, and transversely seated thereon a wire-receiving portion, a revolving detaining-head, and radially-disposed slots thereon; wire-feeding mechanism and wire-cutting mechanism, said loop-former being adapted to make contact upon the slots of the detaining-head at which time the twister rotates to form the twisted loop.

13. The combination of a rotating twister having a shank portion and transversely positioned thereon a wire-contacting portion, and mechanism for delivering the wire upon the wire-contacting portion; a rotating loop-former having a shank portion and transversely seated thereon a wire-receiving portion; mechanism for rotating the twister; a revoluble detaining-head and radially-disposed slots thereon; wire-feeding mechanism and wire-cutting mechanism, said loop-former being adapted to make contact upon the slots of the detaining-head at which time the twister rotates to form the twisted loop.

14. The combination of a rotating twister having a shank portion, and transversely positioned thereon a wire-contacting portion, and mechanism for delivering the wire upon the wire-contacting portion; a rotating loop-former having a shank portion, and transversely seated thereon a wire-receiving portion, mechanism for rotating the twister and loop-former; a revoluble detaining-head and radially-disposed slots thereon; wire-feeding mechanism, wire-cutting mechanism, and wire-straightening mechanism, said loop-former being adapted to make contact upon the slots of the detaining-head at which time the twister rotates to form the twisted loop.

15. The combination of a rotating twister having a shank portion, and transversely positioned thereon a wire-contacting portion, a rotating loop-former having a shank portion and transversely seated thereon a wire-receiving portion, a revoluble detaining-head and radially-disposed slots thereon, wire-feeding mechanism, wire-cutting mechanism and wire-straightening mechanism; said loop-former being adapted to make contact upon the slots of the detaining-head at which time the twister rotates to form the twisted loop; a shaft, and revoluble thereon a series of radially-disposed wire-receiving receptacles, said receptacles being adapted to receive wire before and after being cut.

16. The combination of a rotating twister having a shank portion, and transversely positioned thereon, a wire-contacting portion; a rotating loop-former having a shank portion, and transversely seated thereon a wire-receiving portion; a revoluble detaining-head, and radially-disposed slots thereon; wire-feeding, wire-cutting and wire-straightening mechanism; said loop-former being adapted to make contact within the slots of the detaining-head at the time the twister rotates to form a twisted wire loop; a shaft, and revoluble thereon a series of radially-disposed wire-receiving receptacles, a double and similarly toothed conveying-wheel mounted upon said shaft, said receptacles being adapted to contain wire before being cut and after the wire loop has been twisted; said receptacles, conveying-wheel and detaining-head being adapted to convey wire during their radial movement upon said shaft.

17. The combination of a rotating twister having a shank portion, and transversely positioned thereon a wire-contacting portion; a rotating loop-former having a shank portion, and transversely seated thereon a wire-receiving portion; a revoluble detaining-head, and radially-disposed slots thereon; wire-straightening, wire-feeding and wire-cutting mechanism; said loop-former being adapted to make contact with the slots of the detaining-head at the time the twister rotates to form a twisted-wire loop; a shaft, and revoluble thereon a series of radially-disposed wire-receiving tube-receptacles; a series of radially-disposed longitudinally-bisected tubes and a double similarly-toothed conveying-wheel mounted upon said shaft, the overlapping guards 54, said tube-receptacles and series of bisected tubes being adapted to contain wire before the wire has been cut and after the wire loop has been twisted; said receptacles, bisected tubes, conveying-wheel and detaining-head being adapted to convey wire during their radial movement upon said shaft.

18. The combination of a rotating twister having a shank portion 123, and a wire-contacting portion 124, a rotating loop-former having a shank portion and transversely-seated wire-receiving portions 106 and 105 thereon, the revoluble detaining-head 47, the separating-head 48 and the finger 150, the slots 91 within the detaining-head, the feed-wheels 18 and 19 with the actuating-spring 30 upon the lever 29, the straightening-wheels 33, the disks 74 and 75, the dog-levers 80 and 81, the cutting-shears 65 and 66, the spring-actuating rod 84, the lugs 67 and 77 upon said disks; said loop-former being adapted to make contact with the slots of the detaining-head at the time the twister rotates to form a twisted-wire loop; the shaft 52 and the series of tubes 53, the bisected tubes 83, the conveying-wheel 49, detaining-head 47 and separating-head 48 mounted revolubly upon said shaft; the curved arms 55 radially disposed about and disposed to rotate by operation of said shaft; the overlapping guards 54 upon said arms; computing devices consisting of the lever 129, the plunger 131, the wheel 135 having a blank periphery and a partly-mutilated periphery, the shaft 61 with its radially-extending arm 140, the lever 137 adapted to make contact with periphery of wheel 135 and with arm 140, the arms 62 upon shaft 61; the guide-chamber 64 containing the slot 88; the blocks 92 upon the detaining-head, the depressing-arm 111, the crank 90 and the arm 89 rigidly disposed thereon, said crank being adapted to rotate and make contact with blocks 92 upon the detaining-head, and the arm 89 adapted to make contact with the depressing-arm 111; said depressing-arm being adapted to move within the slot 88; said series of tubes and bisected tubes being adapted to contain wire before said wire has been cut and after the loop has been twisted; said receptacles, bisected tubes, conveying-wheel and detaining-head being adapted to convey wire during the radial movement of the shaft upon which they are mounted.

In testimony whereof I have affixed my signature in presence of two witnesses.

GORDON A. RUMBEL.

Witnesses:
  FREDERIC BACON,
  ARTHUR STURGES.